United States Patent [19]

Elris et al.

[11] Patent Number: 4,814,651
[45] Date of Patent: Mar. 21, 1989

[54] EXPLOSION-PROOF ELECTRICAL GENERATOR SYSTEM

[76] Inventors: Viggo Elris, 5008 - 22 Street S. W., Calgary, Alberta, Canada, T2T 5T9; Roderick M. Johnson, 39 Abergale Place N. E., Calgary, Alberta, Canada, T2A 5J3; Robert R. Hamilton, 527 Crescent Boulevard S. W., Calgary, Alberta, Canada, T2S 1K8; Elliott J. Baly, 1302 W. Fifth St., Duluth, Minn. 55806

[21] Appl. No.: 63,351

[22] Filed: Jun. 18, 1987

[30] Foreign Application Priority Data

May 13, 1987 [CA] Canada ................................ 537068

[51] Int. Cl.⁴ .................................................. H02K 5/04
[52] U.S. Cl. ........................................ 310/88; 310/62; 310/67 R; 310/156
[58] Field of Search .................... 310/88, 67 R, 62, 58, 310/63, 59, 60 R, 156, 89, 267, 268, 254

[56] References Cited

U.S. PATENT DOCUMENTS

| 1,362,049 | 12/1920 | Starker | 310/58 |
| 3,445,696 | 5/1969 | Erickson | 310/62 |
| 4,074,157 | 2/1978 | Lace | 310/67 R |
| 4,617,484 | 10/1986 | Buijsen | 310/67 R |
| 4,701,654 | 10/1987 | Tatukawa | 310/67 R |

FOREIGN PATENT DOCUMENTS

2494517  5/1982  France .................... 310/63

Primary Examiner—R. Skudy
Attorney, Agent, or Firm—William R. Hinds; George H. Dunsmuir

[57] ABSTRACT

An explosion-proof electrical generator includes a generally toroidal casing with one open end and a central circular end wall or plate or cylindrical fan-containing cup extending across and closing the center of the torus; a circular cover closing the open end of the casing; a stator defined by laminated plates and windings located in the annular recess of the casing; and a rotor mounted in the cover and including a shaft, and a bowl-shaped cup carrying a ring of permanent magnets in its side wall, which extends into the casing recess between the stator and the outer side wall of the casing. Cooling fins are provided on the casing and cover for dissipating heat produced in the generator. The generator has a circuitous or small interior flame path for reducing flame temperature and thus the likelihood of fire or explosion outside of the generator.

13 Claims, 6 Drawing Sheets

EXPLOSION-PROOF ELECTRICAL GENERATOR SYSTEM

BACKGROUND OF THE INVENTION

This invention relates to an electrical generator.

Electrical generators used in certain environments such as natural gas plants and gas pipeline pumping stations must be provided with special venting such as tubing or piping for carrying gases out of the building. Moreover, expensive, high strength casings must be provided in order to ensure that the generators are explosion-proof. The cost involved in providing properly vented, explosion-proof electrical generators can be quite high, particularly in view of the fact that a gas pipeline may include up to one hundred and fifty pumping stations, each equipped with an expensive fuel cell electrical generator unit with a short life span of three to four years.

Accordingly, a need exists for a relatively inexpensive, explosion-proof electrical generator. The object of the present invention is to meet such need. By "explosion-proof" is meant a generator in which the likelihood of explosion is reduced to a minimum.

BRIEF SUMMARY OF THE INVENTION

Accordingly, the present invention relates to an electrical generator comprising:

(a) generally toroidal casing means with an open end, said casing means including:
  (i) radially outer side wall means,
  (ii) radially inner side wall means,
  (iii) annular outer end wall means extending between one end of said outer and inner side wall means, and
  (iv) inner end wall means extending across the toroidal casing and joining the other end of said inner side wall means, the casing means defining an outer annular recess bounded generally by said outer and inner side wall means and said annular outer end wall means, the annular outer recess generally surrounding a central recess bounded by said inner side wall means and said inner end wall means;

(b) a stator assembly mounted on said inner side wall means in said outer annular recess;

(c) circular cover means closing said open end of said casing means and extending across but axially spaced from said inner end wall means;

(d) rotor means rotatable in said casing means and supported therein by a rotary shaft extending axially into the casing means, said rotor means including:
  (i) permanent magnet means; and
  (ii) outer cup means carrying said magnet means, said outer cup means including plate means oriented generally radially in the space between said circular cover means and said inner end wall means and extending outwardly to substantially axially overlie said outer annular recess, and side wall means extending from said plate means into said outer side wall means of the casing means, the clearances and spacings between elements being such as to define a restricted flame path in the generator such that the temperature of any flame in the generator will drop sufficiently to prevent the ignition of the atmosphere in the immediate vicinity of the generator.

BRIEF DESCRIPTION OF THE DRAWINGS

The invention will be described in greater detail with reference to the accompanying drawings, which illustrate preferred embodiments of the invention, and wherein.

DESCRIPTION OF THE PREFERRED EMBODIMENTS

With reference to FIGS. 1 to 5, an electrical generator in accordance with the present invention includes a casing generally indicated at 1, and a cover generally indicated at 2. The casing is generally toroidal in shape, and is defined by an outer side wall 3, an inner side wall 4, an outer end wall 5 integral with the side walls 3 and 4, and an inner end wall 6 integral with the inner periphery of the inner end of the inner side wall 4. An internally threaded nipple 8 is provided on the outer end wall 5 for receiving power output wiring (not shown). The casing 1 is reinforced by a plurality of radially extending ribs 10, which also function as cooling fins for dissipating heat produced by the generator. The inner end 11 of the outer side wall 3 is thick for receiving bolts 13, which connect the cover 2 to the casing 1.

Figure 1:
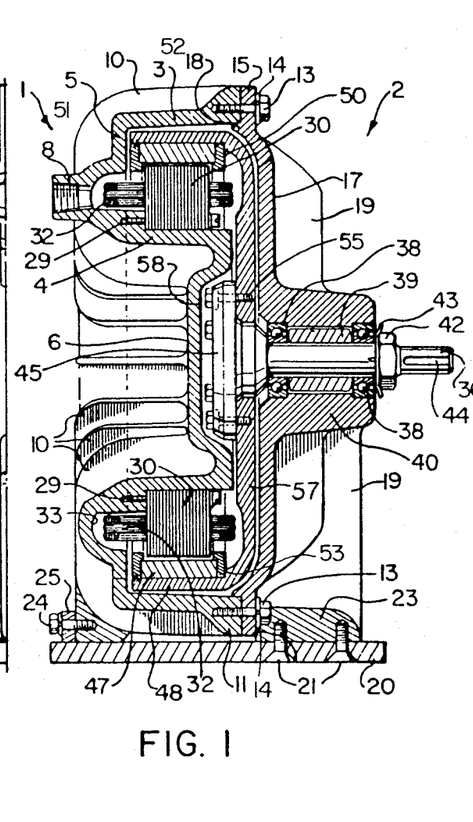
FIG. 1 is a cross-sectional view of an electrical generator in accordance with the present invention.
Figure 2:
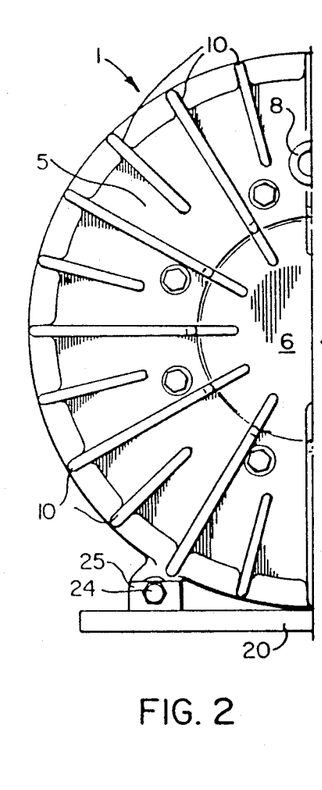
FIG. 2 is an end view of one-half of the casing of the generator of FIG. 1, as seen from the left of FIG. 1.
Figure 3:
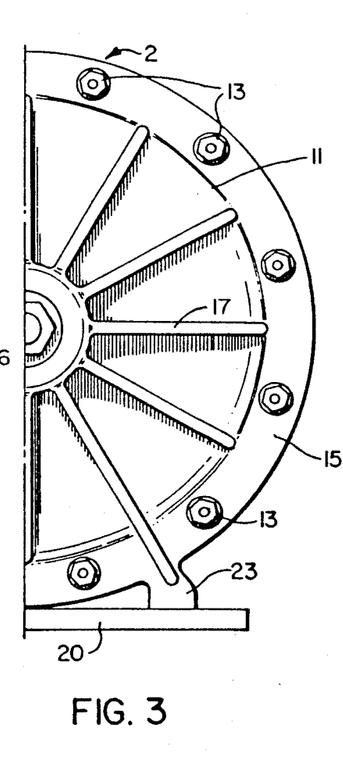
FIG. 3 is an end view of one-half of the casing of the generator of FIG. 1, as seen from the right of FIG. 1.

The bolts 13 extend through washers 14 and the annular periphery 15 of the circular cover 2 into the end 11 of the casing 1.

The cover 2 is defined by a circular plate 17 with an inwardly extending annular flange or shoulder 18 for mating with the end 11 of the casing 1 for providing a tight seal. Radially extending reinforcing ribs 19 are also provided on the cover 2. The casing 1 and the cover 2 are mounted on a base plate 20 by means of bolts 21 extending into feet 23, and bolts 24 extending into lugs or posts 25.

A stator assembly generally indicated at 26 (FIG. 4) is fixedly mounted in an annular recess 27 defined by the side walls 3 and 4, and the end wall 5 of the casing 1. The stator assembly 26 is retained in the casing 1 by bolts 29 extending into the end wall 5. The stator assembly 26 includes laminated plates 30 and field coil windings 32. The annular plates 30 bear against the inner side wall 4 of the casing 1. The windings 32 extend into an annular well 33 at the outer end of the recess 27.

Figure 4:
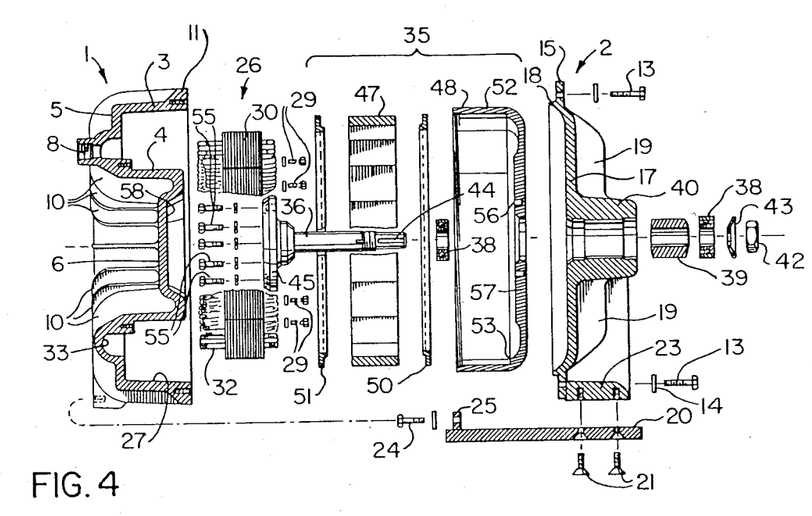
FIG. 4 is an exploded, cross-sectional view of the generator of FIGS. 1 to 3.
Figure 5:
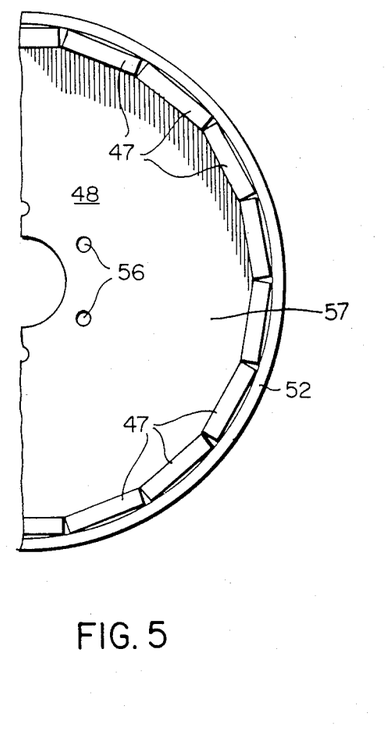
FIG. 5 is an end view of a cup portion of a rotor element, as seen from the left in FIG. 4.

A rotor assembly, generally indicated at 35 in FIG. 4, is rotatably mounted in the cover 2. The rotor assembly 35 includes a shaft 36 extending through ball bearings 38 and a spacer 39 in a sleeve 40 of the cover 2. The sleeve 40 is integral with the plate 17, extending outwardly therefrom for receiving the shaft 36, bearings 38 and the spacer 39. The bearings 38 and spacer 39 are retained on the threaded end of the shaft 36 by a nut 42 and a washer 43 (FIG. 1). Longitudinally extending grooves 44 are provided in the outer end of the shaft 36 for connecting the shaft to a gas motor (not shown) or other source of power.

A circular hub 45 integral with the inner end of the shaft 36 holds the remaining elements of the rotor assembly 35. Such elements include a plurality of rectangular, ceramic permanent magnets 47, which are mounted in a bronze, bowl-shaped cup 48, and retainer rings 50 and 51. The magnets 47 are securely mounted in the cup 48 using an epoxy glue, which fills the spaces between the magnets 47 and the side wall 52 of the cup 48, and between adjacent magnets 47. The inner retainer ring 50 bears against a shoulder 53 in the cup 48 for aligning the magnets 47. The outer ring 51 is externally threaded for coupling with the internally threaded, cylindrical side wall 52 of the cup 48. Bolts 55 are used to connect the cup 48 to the hub 45 and consequently to the shaft 36. The bolts 55 extend through the periphery of the hub 45 into threaded holes 56 in the circular outer end wall 57 of the cup 48. The outer surface of the end wall or plate 57 is slightly frusto-conical for defining a specific flame path shape, as described hereinafter in greater detail. When assembled, the hub 45 of the rotor extends into a central recess 58 in the centre of the casing 1.

The above described generator is of the three phase alternator type. No brushes, commutators or slip rings are used, power being taken directly from the coils 32. Thus, the normal causes of explosion or fire which may occur in the spaces in the casing 1 are eliminated. By sealing the rotating permanent magnets 47 to the machined inner periphery of the cup 48, the likelihood of displacement or shattering of the magnets is substantially reduced or eliminated. The fins 10 and 19 on the casing 1 and cover 2 provide adequate cooling of outer surfaces, and consequently of the interior of the generator. The flush mounting of the plates 30 against the inner side wall 4 of the casing 1 is a direct metal to metal contact, which ensures efficient heat transfer of heat over a large area of the casing.

It will be noted that the magnets 47 and the side wall 52 of the cup 48 extend into a space between the outer side wall 3 of the casing 1 and the outer periphery of the stator plates 30. Thus, air space in the interior of the casing 1 is reduced to a minimum. What space there is in the casing 1 is designed to provide a circuitous and progressively smaller flame path for any flame produced in the casing 1. As best shown in FIG. 1, flame originating in the area of the windings 32 must pass through the space between the retainer ring 51 and the casing end wall 5, the space between the cup side wall 52 and the casing outer side wall 3, and the space between circular plate 17 of the cover and the outer end wall 57 of the cup 48. Since the outer surface of the wall 57 of the cup 48 is slightly frusto-conical, the flame path in the casing becomes generally progressively thinner or more restricted.

Referring to FIGS. 6 to 9, in a second embodiment of the invention, a casing generally indicated at 60 (FIG. 6) is defined by a generally toroidal end section 61 and a sleeve 62 which are connected to each other and to a cover 64 by bolts 65 and washers 66. The casing end section 61 includes an outer side wall 67 (which effectively is extended by sleeve 62), an inner side wall 68, and an outer end wall 69 integral with the outer and inner side walls. An internally threaded nipple 70 is provided on the end wall 69 for receiving power output wiring (not shown). Radially extending ribs 71 reinforce the end section 61, and function as cooling fins for dissipating heat. Longitudinally extending fins 72 on the sleeve 62 perform the same functions as the ribs 71. An inwardly extending annular flange or shoulder 73 (FIG. 9) on the interior surface of the planar, annular periphery 74 of the casing section 61 mates with the sleeve 62 for providing a tight seal between the two. A pair of legs 75 (FIGS. 7 and 8) are provided on the sleeve 62 for mounting the casing and cover on a base plate 76. Bolts 77 extend through the plate 76 into the legs 75.

Figure 9:
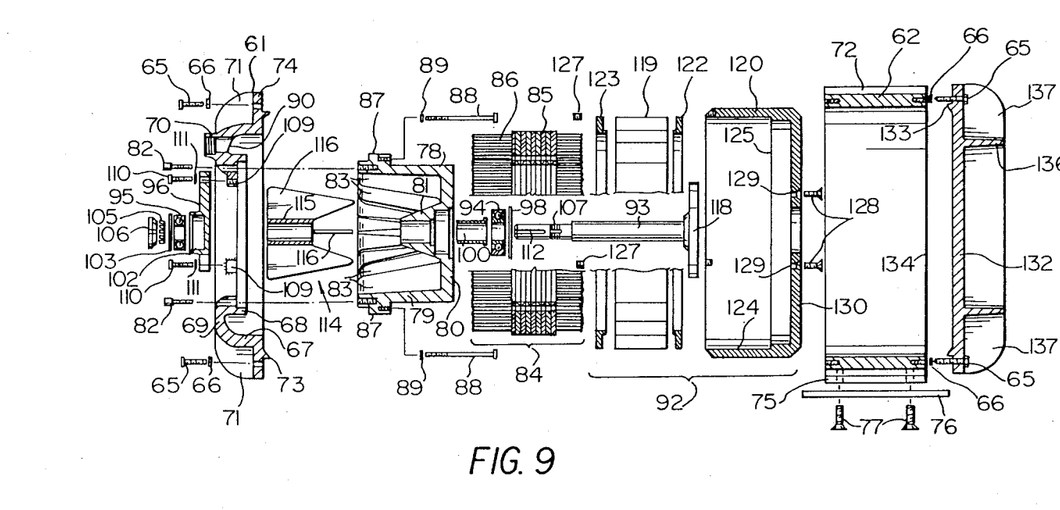
FIG. 9 is an exploded, cross-sectional view of the generator of FIGS. 6 to 8.

The casing 60 is completed by an outwardly opening inner cup 78 which includes a cylindrical side wall 79 (effectively constituting an extension of inner side wall 68) and a circular inner end wall 80 with an outwardly extending, frusto-conical central hub 81. The cup 78 is connected to the casing end section 61 by bolts 82 extending into threaded recesses in the outer end of the side wall 79. Outwardly tapering cooling fins 83 are provided on the inner surface of the cup 78.

A stator assembly generally indicated at 84 is fixedly mounted on the cup 78. The stator assembly 84 includes laminated plates 85 and field windings 86. The assembly 84 is connected to outwardly extending lugs 87 on the open end of the cup 78 by bolts 88 and washers 89. When the generator is assembled, the windings 86 extend into an annular well 90 in the end section 61 of the casing 60.

A rotor assembly generally indicated at 92 is rotatably mounted in the casing 60. The rotor assembly 92 includes a shaft 93 extending through ball bearings 94 and 95 in the hub 81 of the cup 78 and in a trifurcated bracket 96, respectively, which partially closes the open outer ends of the casing section 61. The bearing 94 is retained in the hub 81 by a clip 98. The shaft 93 is rotatably supported in the hub 81 by a bronze bushing 100. The bearing 95 is retained on the shaft 93 in a recess 102 in the bracket 96 by a clip 103, a lock washer 105 and a nut 106, which engages threads 107 on the shaft. The bracket 96 is connected to radially inwardly extending lugs 109 on the inner side wall 68 of the casing section 61 by bolts 110 and washers 111. Grooves 112 are provided in the outer end of the shaft 93 for connecting the shaft to a gas motor (not shown) or other source of power.

A fan generally indicated at 114 (FIG. 9) for cooling the casing interior is mounted on the shaft 93 in the cup 78. The fan includes a cylindrical hub or sleeve 115 and four blades 116 spaced equidistant apart on the sleeve. The blades 116 taper inwardly, i.e. are complementary in shape to the fins 83 and the hub 81 of the cup 78.

A circular hub 118 integral with the inner end of the shaft 93 holds the remaining elements of the rotor assembly 92. Such elements include a plurality of rectangular, ceramic permanent magnets 119, which are mounted in a mild steel, bowl-shaped cup 120, and retainer rings 122 and 123. The magnets 119 are securely mounted in the cup 120 using an epoxy glue, which fills the spaces between the magnets 119 and the side wall 124 of the cup 120, and between adjacent magnets 119. The inner retainer ring 122 bears against a shoulder 125 in the cup 120 for aligning the magnets 119. The outer retainer ring 123 fits snugly into the open end of the cup 120 and is locked into position by set screws 127 which are threaded equally into the cylindrical side wall 124 of the cup 120 and the outer edge of the ring 123. Bolts 128 connect the cup 120 to the hub 118 and consequently to the shaft 93. The bolts 128 extend through holes 129 in the circular outer end wall 130 of the cup 120 into threaded holes in the hub 118.

The cover 64 is defined by a circular plate 132 with an inwardly extending annular flange or shoulder 133 for mating with the end 134 of the sleeve 62. A ring 136 and radially extending ribs 137 on the plate 132 reinforce the cover 64 and facilitate cooling of the generator.

As in the case of the first embodiment of the invention, the second embodiment of the invention is a three phase, alternator type generator, which uses no alternator brushes, commutators or slip rings, power being taken directly from the coils 86. Thus, the normal causes of explosion or fire which may occur in the spaces in the casing are eliminated. By sealing the rotating permanent magnets 119 to the machined inner periphery of the cup 120, the likelihood of displacement or shattering of the magnets is substantially reduced or eliminated. The fins 71, 72, 136 and 137 on the casing and cover provide adequate cooling of outer surfaces, and assist in cooling the interior of the generator. The fan 114 also cools the interior of the generator. The flush mounting of the plates 85 of the stator against the outer side wall 79 of the cup 78 is a direct metal to metal contact, which ensures efficient heat transfer of heat over a large area of the casing.

Figure 6:
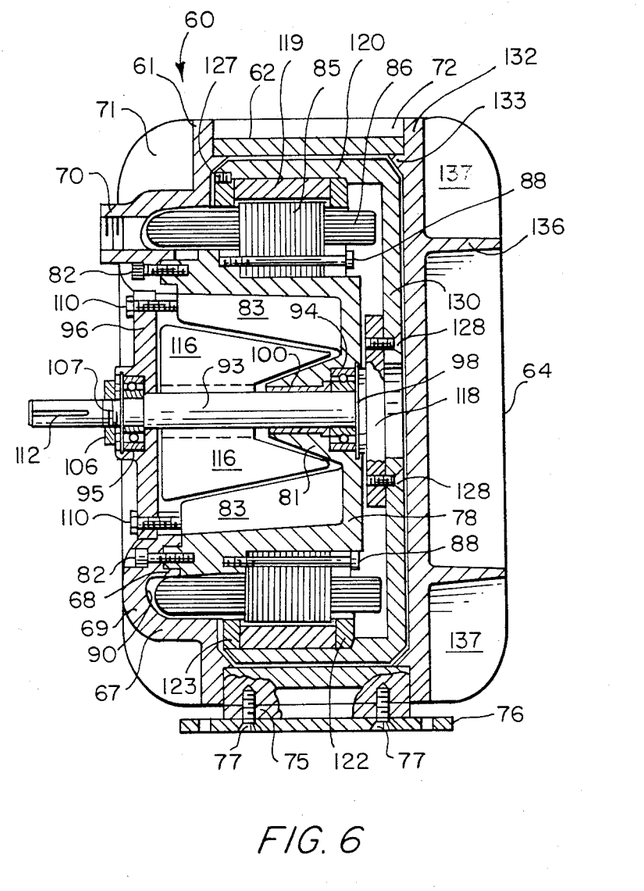
FIG. 6 is a cross-sectional view of a second embodiment of the electrical generator of the present invention.
Figure 7:
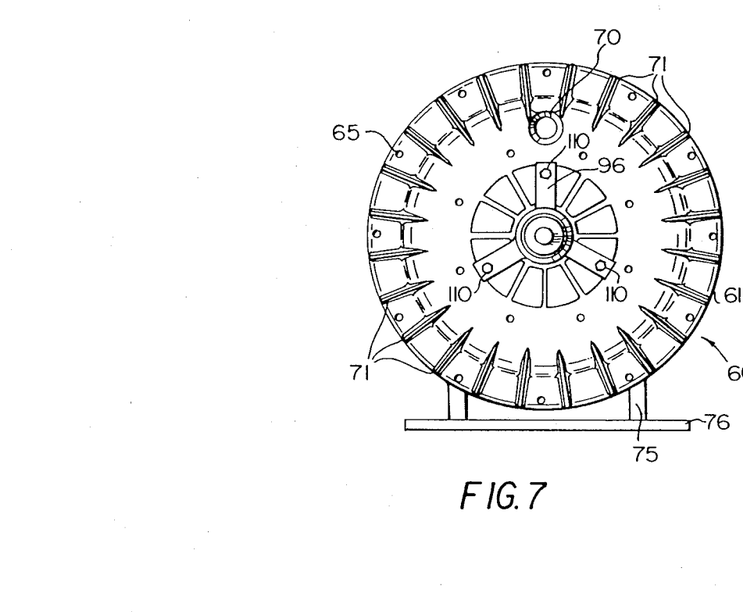
FIG. 7 is an end view of the generator of FIG. 6 as seen from the left of FIG. 6.
Figure 8:
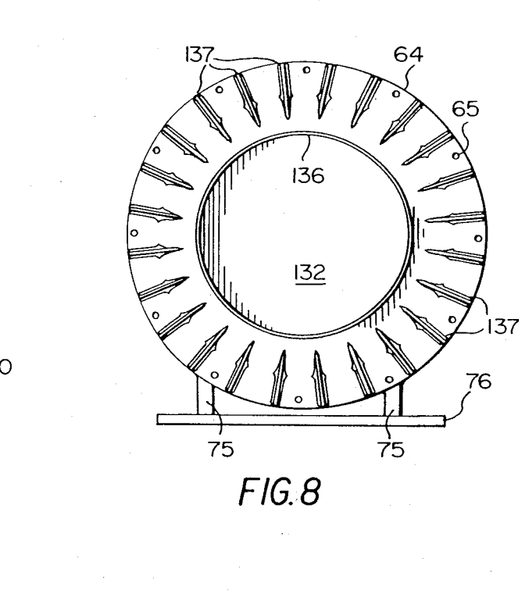
FIG. 8 is an end view of the generator of FIG. 6 as seen from the right of FIG. 6.

It will be noted that the magnets 119 on the side wall 124 of the cup 120 extend into and occupy most of the space between an outer side wall defined by the sleeve 62 and the outer periphery of the stator plates 85. Thus, air space in the interior of the casing is reduced to a minimum. What space there is in the casing is designed to provide a narrow path for any flame produced in the casing. As best shown in FIG. 6, flame originating in the area of the windings 85 must pass through the area of least resistance, namely the path defined by a gap between the shaft 93 and the bushing 100. During passage through such gap, the temperature of the flame drops sufficiently to prevent ignition of the outer atmosphere.

Both embodiments of the invention provide protection of the generator interior from the exterior and vice versa. The generator is believed to meet the Canadian Standards Association definition for a Class I enclosure, namely "an enclosure for an electrical apparatus which is capable of withstanding without damage an explosion which may occur within it, of a specified gas or vapour; and capable of preventing ignition of the specified gas or vapour surrounding the enclosure by sparks or flames from the explosion of the specified gas or vapour in normal use or under any condition likely to occur in practice".

What we claim is:

1. An electrical generator comprising:
   (a) generally toroidal casing means with an open end, said casing means including:
      (i) radially outer side wall means,
      (ii) radially inner side wall means,
      (iii) annular outer end wall means extending between one end of said outer and inner side wall means, and
      (iv) inner end wall means extending across the toroidal casing and joining the other end of said inner side wall means, the casing means defining an outer annular recess bounded generally by said outer and inner side wall means and said annular outer end wall means, the annular outer recess generally surrounding a central recess bounded by said inner side wall means and said inner end wall means;
   (b) a stator assembly mounted on said inner side wall means in said outer annular recess;
   (c) circular cover means closing said open end of said casing means and extending across but axially spaced from said inner end wall means;
   (d) rotor means rotatable in said casing means and supported therein by a rotary shaft extending axially into the casing means, said rotor means including:
      (i) permanent magnet means; and
      (ii) outer cup means carrying said magnet means, said outer cup means including plate means oriented generally radially in the space between said circular cover means and said inner end wall means and extending outwardly to substantially axially overlie said outer annular recess, and side wall means extending from said plate means into said outer annular recess between said stator assembly and the outer side wall means of the casing means, the clearances and spacings between such elements being such as to define a restricted flame path in the generator such that the temperature of any flame in the generator will drop sufficiently to prevent the ignition of the atmosphere in the immediate vicinity of the generator.

2. A generator according to claim 1, wherein said plate means of said outer cup means is substantially frusto-conical, and the flame path starts between the end of the side wall means of the outer cup means relatively away from said plate means and the outer end wall means of the casing means and progresses between the side wall means of the cup means and the outer side wall means of said casing means to a radially inwardly tapering space between the plate means of the said cup means and said cover means.

3. A generator according to claim 2, wherein said outer side wall means of said casing means flares from its end adjacent said outer end wall means to the open end thereof.

4. A generator according to claim 1, wherein said magnet means includes a plurality of discrete permanent magnets on the inner periphery of the side wall means of said cup means.

5. A generator according to claim 4, wherein said magnets are arranged in side-by-side relationship on the side wall means of said cup means to define a ring of magnets and are secured to each other and to said cup means by an epoxy resin.

6. A generator according to claim 5, including ring means further retaining said magnets in said outer cup means.

7. A generator according to claim 1, wherein said rotor means includes shaft means rotatable in said cover means, and hub means on the inner end of said shaft means carrying said cup means.

8. A generator according to claim 7, including cooling fin means on said casing means and said cover means for dissipating heat produced in said generator.

9. A generator according to claim 1, wherein said casing means includes a substantially toroidal end section; sleeve means defining a portion of the outer side wall means; and inner cup means defining at least part of said inner side wall means and generally forming a central cylinder for carrying said stator assembly, the interior of said inner cup means comprising said central recess.

10. A generator according to claim 9, wherein said inner cup means including hub means for rotatably supporting said rotor means.

11. A generator according to claim 10, wherein said rotor means includes shaft means rotatable in said inner cup means, and hub means on an inner end of said shaft means carrying said outer cup means concentric with and outside of said inner cup means.

12. A generator according to claim 11, including fan means on said shaft means in said central recess of said inner cup means for cooling the generator.

13. A generator according to claim 12, including bracket means connected to said end section for rotatably supporting said shaft means in said inner cup means.

* * * * *